Nov. 3, 1925.  
S. P. HICKEY  
1,560,233  
AUXILIARY WHEEL TREAD  
Filed Sept. 29, 1923
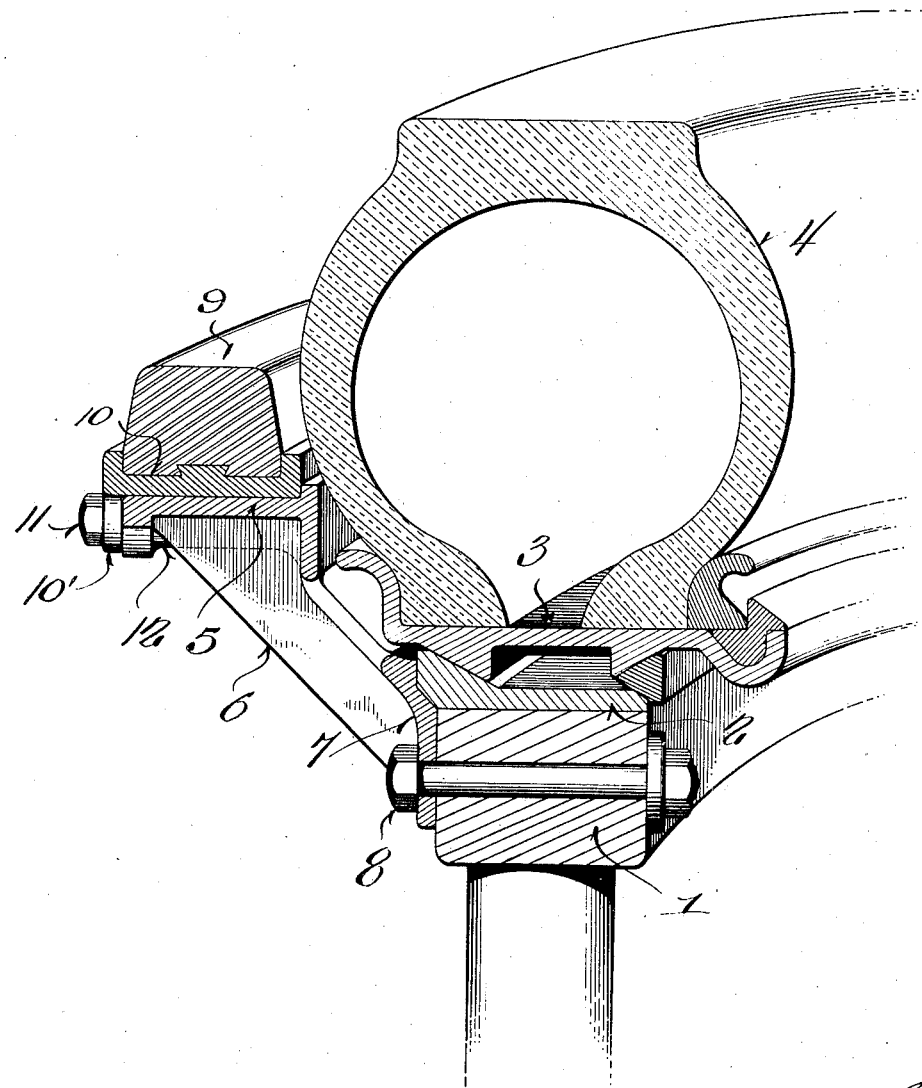
Witness:  
P. E. Weber
Inventor:  
Stanley P. Hickey Patented Nov. 3, 1925.

1,560,233

UNITED STATES PATENT OFFICE.

STANLEY P. HICKEY, OF COLDSPRING, WISCONSIN.

AUXILIARY WHEEL TREAD.

Application filed September 29, 1923. Serial No. 665,598.

*To all whom it may concern:*

Be it known that I, STANLEY P. HICKEY, a citizen of the United States, and resident of township of Coldspring, in the county of Jefferson and State of Wisconsin, have invented certain new and useful Improvements in Auxiliary Wheel Treads; and I do hereby declare that the following is a full, clear, and exact description thereof.

This invention relates to auxiliary wheel treads, and has primarily for its object to provide a tread designed for use in connection with pneumatic tired wheels, whereby, upon deflation of the tire, the wheel is supported upon the auxiliary tread.

Due to present congested conditions on highways, which often makes it impossible and dangerous to attempt repair or changing of a deflated tire, and the fact that a large number of vehicles are operated by women and persons incapable of effecting immediate repairs, vehicles are often run a considerable distance upon deflated tires, with the result of serious damage to the tire, and in some instances to the rim and wheel structure.

The object of the present invention is, therefore, to overcome the foregoing and provide an auxiliary tread which will permit vehicles to be driven for short distances to a garage or repair station without damage to the deflated tire or other parts of the vehicle.

A further advantage and object of the present invention resides in its use as a guard or protector against stone bruises resulting from running over stones, railroad tracks, or engaging the sharp edges of curbstones or other obstacles, when the tires are only partially deflated.

A more specific object is to provide a device of the foregoing character, which may be constructed in the form of an attachment for vehicle wheels of conventional structure, thereby eliminating special design or alteration of wheel structure.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

The single view is a transverse section through a conventional vehicle wheel with the present invention attached thereto.

Referring more particularly to the accompanying drawings, the present invention is shown in connection with a conventional wood vehicle wheel comprising a felloe 1, provided with the felloe band 2, upon which is mounted a demountable rim 3 of the conventional straight side type. The rim 3 carries a pneumatic tire casing 4 of any desired structure.

For the purpose of illustrating one form in which the present invention may be designed, I have shown an auxiliary rim 5 positioned adjacent the casing 4, which rim is provided with inwardly extending spaced arms 6 which carry an annular plate 7 adapted to be secured to the side of the felloe 1 by means of bolts 8 passing therethrough.

Mounted on the auxiliary rim 5, either directly, or preferably as shown, is a resilient tread 9 formed of rubber, or other suitable material, and provided with the retaining band 10 which is locked on the auxiliary rim by means of the screws 11 which pass through the depending lugs 10' on the retaining band and are threaded into bosses 12 spaced at suitable intervals throughout the rim 5.

As illustrated in the drawing, the tread 9 is of considerably smaller diameter than the tread of the casing 4 when the latter is inflated, thus, under normal conditions, permitting the vehicle to travel on the tire, and because of the spaced relation between the casing 4 and the tread 9, the free action, or flexing of the casing, is in no way interfered with.

In the event that the casing 4 becomes deflated, as the result of a puncture or blowout, the same will be collapsed to a point where the auxiliary tread 9 will engage the road and relieve the casing of any further strain resulting from the weight of the vehicle.

Attention is further directed to the fact that in spacing the tread 9 from the casing 4, the accumulation of dirt and other material between the two is avoided. Should mud, sand, or snow be encountered, it is obvious that when the casing 4 becomes embedded therein to a certain depth, the tread 9 will not only serve as an additional traction means, but will also prevent further embedding.

While I have illustrated and described one form of constructing the present invention and attaching the same to a conventional type of wood vehicle frame, it is to be understood that various structures are contemplated within the invention, whereby the auxiliary tread may be readily attached to wheels of various types, such as disc or wire wheels.

Further, instead of constructing the device in the form of an attachment for conventional structures of wheels, it will be readily appreciated that the same may form a built-in part of the wheel structure.

I claim:—

An attachment for a vehicle wheel provided with a felly, said attachment comprising an auxiliary rim adapted to project outwardly from said wheel and having an upstanding inner shouldered portion, said attachment having a plate adapted to be bolted to said felly, a plurality of spaced arms joining said auxiliary rim and said plate, a resilient tread, and a retaining band secured to said resilient tread and adapted to be slipped over said auxiliary rim and having depending lugs, whereby it may be attached to said auxiliary rim.

In testimony that I claim the foregoing I have hereunto set my hand at township of Coldspring, in the county of Jefferson and State of Wisconsin.

STANLEY P. HICKEY.